(12) United States Patent
Haberbusch

(10) Patent No.: US 7,043,925 B2
(45) Date of Patent: May 16, 2006

(54) DENSIFIER FOR SIMULTANEOUS CONDITIONING OF TWO CRYOGENIC LIQUIDS

(75) Inventor: Mark S. Haberbusch, Amherst, OH (US)

(73) Assignee: Sierra Lobo, Inc., Fremont, OH (US)

( * ) Notice: Subject to any disclaimer, the term of this patent is extended or adjusted under 35 U.S.C. 154(b) by 125 days.

(21) Appl. No.: 10/466,379

(22) PCT Filed: Jan. 17, 2002

(86) PCT No.: PCT/US02/01527

§ 371 (c)(1),
(2), (4) Date: Jul. 15, 2003

(87) PCT Pub. No.: WO02/057693

PCT Pub. Date: Jul. 25, 2002

(65) Prior Publication Data

US 2004/0060303 A1 Apr. 1, 2004

Related U.S. Application Data

(60) Provisional application No. 60/262,178, filed on Jan. 17, 2001.

(51) Int. Cl.
 F25B 9/00 (2006.01)
 F17C 5/00 (2006.01)

(52) U.S. Cl. .................... 62/6; 62/49.2; 62/54.1
(58) Field of Classification Search ............. 62/6, 62/49.1, 54.1
See application file for complete search history.

(56) References Cited

U.S. PATENT DOCUMENTS

| | | |
|---|---|---|
| 3,237,421 A | 3/1966 | Gifford |
| 3,609,982 A * | 10/1971 | O'Neil et al. ............ 62/6 |
| 3,994,141 A | 11/1976 | Schräwer |
| 4,398,398 A | 8/1983 | Wheatley et al. |
| 4,489,553 A | 12/1984 | Wheatley et al. |

(Continued)

OTHER PUBLICATIONS

National Institute of Standards and Technology (NEL), Boulder, CO Chemical Engineering Science Div., "Analytical Model for the Refrigeration Power of the Orifice Pulse Tube Refrigerator", Dec. 1990, cover page and pp. 4–7.

Thomas M. Tomsik, "Performance Tests of a Liquid Hydrogen Propellant Densification Ground Support System for the X33/RLV", 33rd AIAA/ASME/SAE/ASEE Joint Propulsion Conference and Exhibit, Jul. 6–9, 1997.

S. Backhaus et al., "A thermoacoustic Stirling heat engine", NATURE, vol. 399, May 27, 1999, pp. 335–338.

M.M. Fazah, "STS Propellant Densification Feasibility Study Data Book", NASA Technical Memorandum 108467, Sep. 1994.

(Continued)

Primary Examiner—William C. Doerrler
(74) Attorney, Agent, or Firm—Pearne & Gordon LLP

(57) ABSTRACT

A densifier (10) for simultaneously densifying two cryogenic liquids at different temperatures is provided. The densifier (10) has a thermoacoustic heat engine (20), a resonance tube (18) and a two stage pulse tube refrigerator (40). The thermoacoustic heat engine (20) generates oscillatory acoustical power required to generate net refrigeration power in the two-stage pulse tube refrigerator (40). The first stage (100) densifies a first cryogenic liquid to a first cryogenic temperature, and the second stage (200) densifies a second cryogenic liquid to a second, lower cryogenic temperature. The thermoacoustic heat engine (20) converts thermal energy to the oscillatory acoustical power required to generate net refrigeration in the first (100) and second (200) stages of the pulse tube refrigerator (40). No mechanical energy input is required, and therefore the invented densifier (10) has no moving parts.

51 Claims, 3 Drawing Sheets

U.S. PATENT DOCUMENTS

| | | | |
|---|---|---|---|
| 4,953,366 A | 9/1990 | Swift et al. | |
| 5,154,062 A | 10/1992 | Gaumer, Jr. et al. | |
| 5,168,710 A | 12/1992 | Miyazaki | |
| 5,220,801 A | 6/1993 | Butler et al. | |
| 5,269,147 A | 12/1993 | Ishizaki et al. | |
| 5,275,002 A | 1/1994 | Inoue et al. | |
| 5,280,710 A | 1/1994 | Gaumer, Jr. et al. | |
| 5,301,510 A | 4/1994 | Glasser | |
| 5,303,555 A | 4/1994 | Chrysler et al. | |
| 5,349,813 A | 9/1994 | Eisinger | |
| 5,398,515 A | 3/1995 | Lak | |
| 5,402,649 A | 4/1995 | Glasser | |
| 5,435,136 A | 7/1995 | Ishizaki et al. | |
| 5,488,830 A | 2/1996 | Burt | |
| 5,489,202 A | 2/1996 | Eisinger | |
| 5,519,999 A | 5/1996 | Harpole et al. | |
| 5,561,984 A | 10/1996 | Godshalk et al. | |
| 5,644,920 A | 7/1997 | Lak et al. | |
| 5,647,216 A | 7/1997 | Garrett | |
| 5,705,771 A | 1/1998 | Flynn et al. | |
| 5,711,156 A | 1/1998 | Matsui et al. | |
| 5,791,149 A | 8/1998 | Dean | |
| 5,813,234 A | 9/1998 | Wighard | |
| 5,845,498 A | 12/1998 | Matsui et al. | |
| 5,889,456 A * | 3/1999 | Triebe et al. | 335/300 |
| 5,901,556 A | 5/1999 | Hofler | |
| 5,904,046 A | 5/1999 | Kawano | |
| 5,913,888 A | 6/1999 | Steinmeyer et al. | |
| 5,953,920 A | 9/1999 | Swift et al. | |
| 5,966,942 A | 10/1999 | Mitchell | |
| 5,966,943 A | 10/1999 | Mitchell | |
| 5,983,646 A | 11/1999 | Grothe et al. | |
| 5,996,345 A | 12/1999 | Hofler | |
| 6,021,643 A | 2/2000 | Swift et al. | |
| 6,032,464 A | 3/2000 | Swift et al. | |
| 6,073,450 A | 6/2000 | Lak et al. | |
| 6,116,030 A | 9/2000 | Story | |
| 6,131,395 A | 10/2000 | Greene et al. | |
| 6,151,900 A | 11/2000 | Lak et al. | |
| 6,164,078 A | 12/2000 | Lak et al. | |
| 6,374,617 B1 * | 4/2002 | Bonaquist et al. | 62/6 |
| 6,425,250 B1 * | 7/2002 | Acharya et al. | 62/6 |
| 6,453,681 B1 * | 9/2002 | Lak et al. | 62/50.1 |
| 6,640,553 B1 * | 11/2003 | Kotsubo et al. | 62/6 |

OTHER PUBLICATIONS

D.B. Mann et al., "Liquid–Solid Mixtures of Hydrogen Near the Triple Point", Cryogenics Division–NBS Institute for Material Research, Boulder, Colorado, pp. 207–217, at least as early as 2000.

E. Cady et al., "Solar Thermal Upper Stage Technology Demonstrator Program", 32nd AIAA/ASME/SAE/ASEE Joint Propulsion Conference, Jul. 1–3, 1996.

Ray Radebaugh, "Development of the Pulse Tube Refrigerator as an Efficient and Reliable Cryocooler", Proc. Institute of Refrigeration (London) 1999–2000.

Eric Marquardt et al., "Design Equations and Scaling Laws for Linear Compressors with Flexure Springs", Seventh International Cryocooler Conference (Santa Fe, NM) Nov. 17–19, 1992.

* cited by examiner

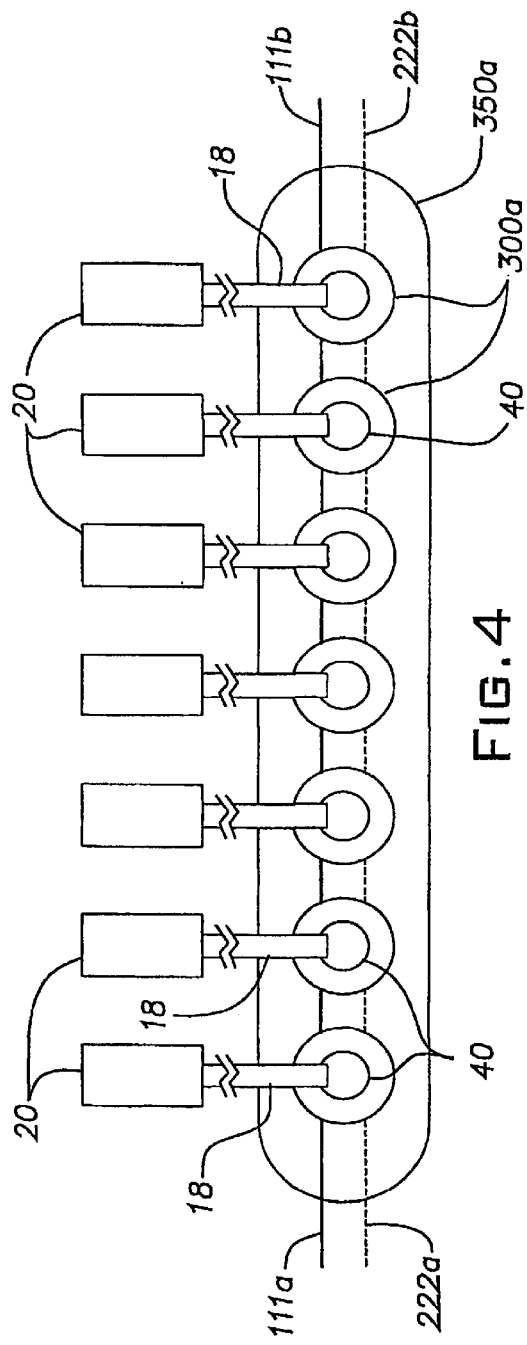
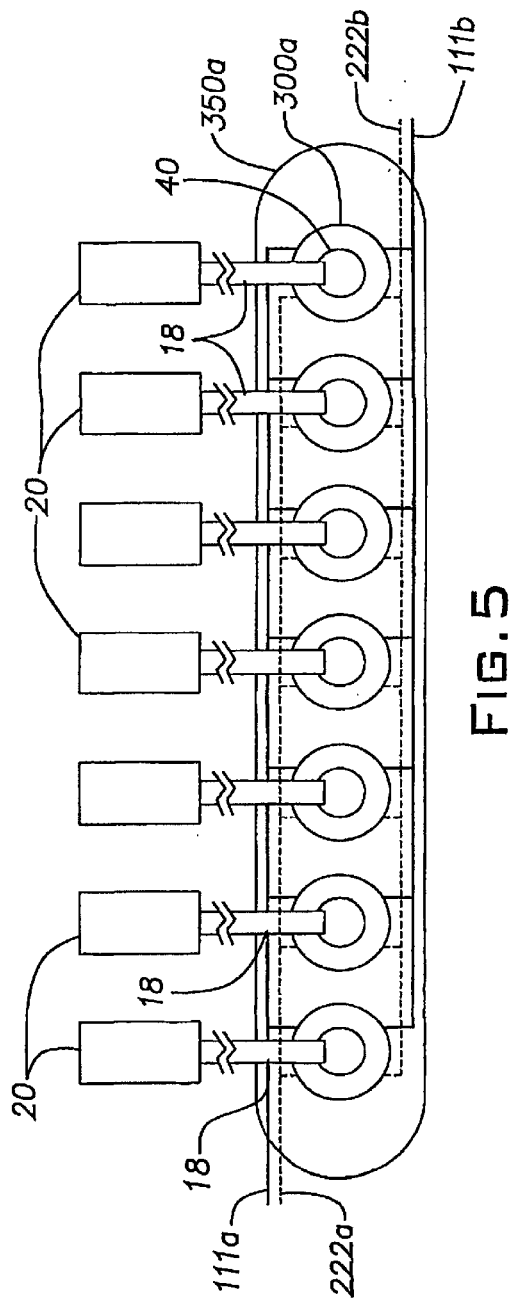

DENSIFIER FOR SIMULTANEOUS CONDITIONING OF TWO CRYOGENIC LIQUIDS

This application is a 371 of PCT patent application No. PCT/US02/01527 filed Jan. 17, 2002, which claims the benefit of U.S. provisional patent application Ser. No. 60/262,178 filed Jan. 17, 2001.

BACKGROUND OF THE INVENTION

1. Field of the Invention

The present invention relates to a densifier for the simultaneous conditioning and densification of two cryogenic liquids, and more particularly to a fully acoustic densifier for the simultaneous densification of two cryogenic propellants at different temperatures.

2. Description of Related Art

Aerospace vehicles and spacecraft such as the space shuttle burn hydrogen fuel in the presence of oxygen for propulsion. To achieve maximum energy density and minimum storage volume, the hydrogen and oxygen propellants are stored onboard the spacecraft as cryogenic liquids. To achieve even greater energy density and lower volume, it is desirable to densify the cryogenic liquid propellants by subcooling or supercooling them below their normal boiling point temperatures.

Liquid oxygen normally (at 1 ATM) boils at 90.15 K and liquid hydrogen at 20.25 K. At their boiling points, liquid oxygen and liquid hydrogen have densities of approximately 1141 kg/m$^3$ and 70 kg/m$^3$ respectively. However, both oxygen and hydrogen can be densified by supercooling below their boiling points. A densified, supercooled propellant can be stored in a smaller volume and at lower pressure than an equivalent amount (mass) of a saturated liquid propellant.

In the case of a spacecraft or other types of aerospace vehicles, densification of propellants is desirable for at least three reasons. First, increased propellant density translates into smaller propellant tanks which result in lower take-off weight and larger payload capacities. Second, densified propellants require lower operating pressures in propellant tanks, thus extending tank life in reusable systems, lowering recurring costs and reducing life-cycle costs. In addition, lower operating pressures for expendable launch vehicles result in lower pressurizing gas requirements. Third, increased propellant density lowers turbo-machinery rotational speeds which increases reliability and safety, and reduces life-cycle costs for reusable systems.

A fourth potential benefit of supercooled, densified propellants is that the increased cooling capacity of the propellants themselves can provide a potentially vital heat sink for leading edge and shock wave regions of an aerospace vehicle resulting from aerodynamic heating, and for rocket or rocket-based combined cycle (RBCC) engine combustion chambers and nozzles.

Current apparatus and techniques for densifying cryogenic propellants suffer from a number of drawbacks, principal among which is that most require moving parts in a cryogenic refrigeration system. U.S. Pat. No. 5,644,920 describes a method of densifying liquid propellants via circulation through a low temperature cryogenic liquid bath which is maintained under vacuum by a rotary cold gas compressor. According to this method a mechanical machine having moving parts (the compressor) must operate adjacent to or in contact with cryogenic materials likely to cause machine failure. This system was tested and reported by NASA (Tomsik, T. M., "Performance Tests of a Liquid Hydrogen Propellant Densification Ground Support System for the X33/RLV", AIAA-97-2976, July 1997) in a pilot-scale unit designed to densify liquid hydrogen (LH$_2$) from 20 K to a supercooled temperature of about 16.1 K at a rate of 0.9 kg/sec for 60 seconds at steady-state. The test program was cancelled primarily due to failure of the compressor.

A second cold gas compressor apparatus as described above is currently being tested at the NASA Glenn Research Center in Cleveland, Ohio to densify liquid oxygen to support NASA's X-33 launch vehicle (the X-33 oxygen densifier). The X-33 oxygen densifier is designed to densify 13.6 kg/sec of liquid oxygen down to a supercooled temperature of about 67 K at steady state. Testing of the X-33 oxygen densifier has shown the cold gas compression units to be highly unstable, un-repeatable, and unreliable during operation for long periods of time; i.e. the time required to load a launch vehicle. In fact, one of the compressor stages of the X-33 oxygen densifier has failed causing destructive damage to the impeller and impeller housing.

Warm gas compressor systems have also been devised. These systems are similar to the cold gas compressor systems described above, except that warm gas compressors or vacuum pumps are used to create the evaporative cooling effect directly inside the storage tank of the cryogenic propellant. A heat exchanger is used to warm the evacuated vapor prior to entering the vacuum pumps because the pumps cannot handle cold vapors. This technique has been used effectively since the 1960's to make slush nitrogen and hydrogen, however it still requires moving parts and the input of mechanical energy at high cost.

Other known methods of cryogenic liquid propellant densification are described briefly below:

U.S. Pat. No. 6,164,078 teaches that fluid ejectors can be used to create sub-atmospheric pressures in a cryogenic fluid inside a heat exchanger reservoir. The ejector which has no moving parts performs the same function as the cold gas compressors discussed previously. U.S. Pat. No. 6,116,030 teaches the use of a specific ejector that uses steam as the primary motive force. The steam is generated as the combustion product of hydrogen and oxygen. Additional steam is generated by the addition of liquid water to the product steam. U.S. Pat. No. 6,151,900 teaches the use of a second cryogenic fluid to cool a first cryogenic fluid having a higher boiling point. The second cryogenic fluid is injected into the first cryogenic fluid causing the second cryogenic fluid to be vaporized and released through a vent. U.S. Pat. No. 6,131,395 teaches the use of boil-off vapors from a colder second fluid to cool a first cryogenic fluid through indirect heat exchange inside a container. The example given is using the boil-off vapors from gaseous hydrogen to densify liquid oxygen by flowing both fluids through a common heat exchanger. Safety is a concern with this system because a single-point failure between the tube walls of the heat exchangers would allow mixing of the hydrogen and oxygen streams. Turbo-Brayton Cycle Helium Refrigeration Systems are known to work in the temperature and heat-capacity range required for propellant densification systems. However, they too require rotating machinery operating at cryogenic temperatures. Likewise, Stirling cycle refrigerators, which have been used for a long time in cryogenic processes, also have at least two moving parts; a compressor and a displacer. The displacer is located at the cold end of the refrigerator, and is subject to cryogenic temperatures. Indeed, history has shown that cryogenic Stirling refrigeration systems require periodic maintenance to replace the moving parts, contributing to down-time and increased operation cost.

The major disadvantages of the above densification methods are poor reliability and high operational and maintenance costs associated with rotating machinery and moving parts. This is especially true when moving machinery is operated at cryogenic temperatures. The use of uncertain, or unreliable densification technologies for propellant densification is very risky for companies and governments that operate aerospace launch vehicles. This risk is unacceptable, especially when a launch vehicle must launch within a specified time window which may be as narrow as 10 minutes. Such narrow launch windows make intolerable any substantial risk of delay due to propellant densification system failure.

A key disadvantage of evaporative cooling techniques is the generation of sub-atmospheric pressures inside hydrogen storage tanks. This can lead to a potentially catastrophic situation in which air (oxygen) from the atmosphere is drawn into the hydrogen system through a leaky seal or a vent.

There is a need in the art for a system for densifying cryogenic propellants, such as hydrogen and oxygen, that has no moving parts. Preferably, such a system will be at least as efficient as existing densification systems but with no mechanical energy input, and preferably will be capable of simultaneously densifying two cryogenic propellants at two different temperatures.

SUMMARY OF THE INVENTION

A densifier for densifying two cryogenic liquids is provided. The densifier has an oscillatory power source for generating oscillatory power, a resonance tube, and a pulse tube refrigerator. The pulse tube refrigerator is a two-stage pulse tube refrigerator having a first stage refrigeration unit and a second stage refrigeration unit. The first stage refrigeration unit is adapted to supercool a first cryogenic liquid to a first cryogenic temperature, and the second stage refrigeration unit is adapted to supercool a second cryogenic liquid to a second cryogenic temperature, wherein the second cryogenic temperature is lower than the first cryogenic temperature.

A densified propellant management system is also provided. The densified propellant management system has a densifier and a cryogenic temperature probe, wherein the densifier has an oscillatory power source for generating oscillatory power, a resonance tube, and a pulse tube refrigerator. The pulse tube refrigerator is a two-stage pulse tube refrigerator having a first stage refrigeration unit and a second stage refrigeration unit. The first stage refrigeration unit is adapted to supercool a first cryogenic liquid to a first cryogenic temperature, and the second stage refrigeration unit is adapted to supercool a second cryogenic liquid to a second cryogenic temperature, wherein the second cryogenic temperature is lower than the first cryogenic temperature.

BRIEF DESCRIPTION OF THE DRAWINGS

FIG. 4 shows a plurality of invented densifiers oriented in a serial configuration.

FIG. 5 shows a plurality of invented densifiers oriented in a parallel configuration.

DETAILED DESCRIPTION OF THE PREFERRED EMBODIMENTS OF THE INVENTION

As used herein, when a range such as 5 to 25 (or 5–25) is given, this means preferably at least 5, and separately independently, preferably not more than 25. Also as used herein, the porosity of a heat absorptive material used in a regenerator refers to the proportion of void volume over total volume of the regenerator. For example, porosity refers to the total void volume within the regenerator, taking into account both a) the porosity of the heat absorptive material itself, and b) the superficial void space within the regenerator that is not occupied by heat absorptive material packed or present therein. Unless otherwise specified, all components described herein are made from conventional materials in a conventional manner.

Figure 1:
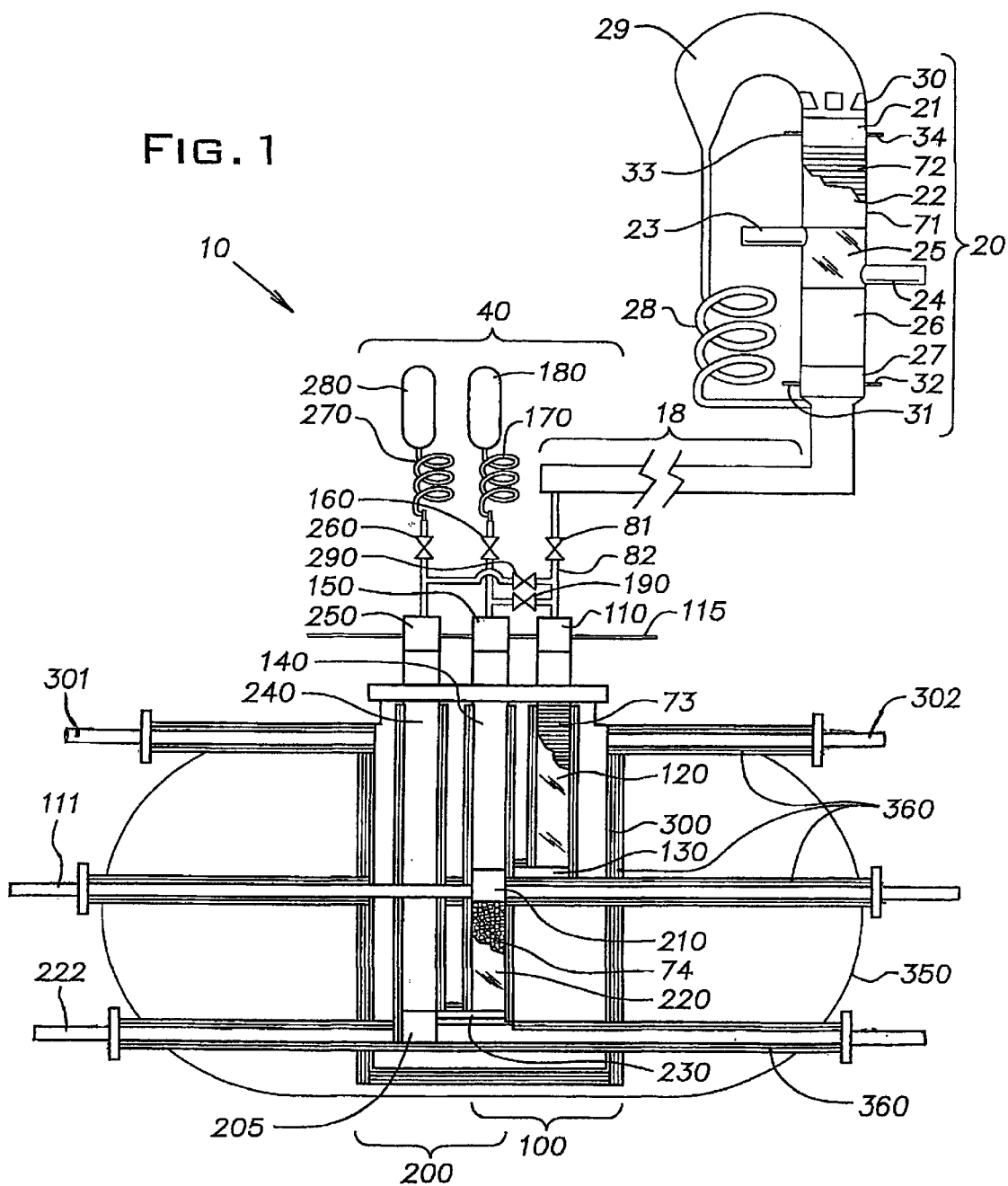
FIG. 1 is a schematic of a first preferred embodiment of a densifier according to the invention.

The invented densifier has three principal components; an oscillatory power source, a resonance tube 18, and a two-stage orifice pulse tube refrigerator (OPTR) 40. Referring to FIG. 1, a fully acoustic densifier 10 is shown having an acoustic heat engine as the oscillatory power source. By fully acoustic, it is meant that no mechanical energy input (and therefore no moving parts) are present or required in the densifier 10; oscillatory acoustical power generated by the acoustic heat engine providing the necessary power to the OPTR 40 for generating net refrigeration power therein. Preferably, the acoustic heat engine is a thermoacoustic prime mover 20 as shown in FIG. 1. The OPTR 40 utilizes acoustical power generated in the prime mover 20 to generate net refrigeration power to supercool cryogenic propellants such as liquid oxygen (LOX) and liquid hydrogen ($LH_2$).

Preferably, the prime mover 20 is a Thermoacoustic Stirling Heat Engine (TASHE). TASHE heat engines are generally known, (for example as described in S. Backhaus and G. W. Swift, "A Thermoacoustic Stirling Heat Engine", *Nature*, Vol. 399, pp. 335–338, May 1999, and R. Radebaugh, "Development of the Pulse Tube Refrigerator as an Efficient and Reliable Cryocooler", *Proceedings of The Institute of Refrigeration* 1999–2000, presented at the Institute of Marine Engineers, 80 Coleman Street, London EC2, Oct. 14, 1999, pp. 1-1 to 1-16). The prime mover 20 preferably comprises a cold heat exchanger 21, a regenerator 22, a hot heat exchanger 25, a thermal buffer tube 26 (which is a hollow tube), an aftercooler 27, an inertance tube 28, a compliance volume 29 and a jet pump 30. Preferably, prime mover 20 is a traveling wave acoustical prime mover. The inertance tube 28 recycles a portion of the oscillatory energy generated by the prime mover back into the compliance volume 29 to be redirected into the regenerator 22 via jet pump 30. The resulting traveling oscillatory wave provides a more efficient prime mover 20 capable of generating greater acoustical power than with a standing oscillatory wave. The operation of a prime mover 20 having the above components to generate an oscillatory gas flow is known in the art, and is further described in the above publications. In the present invention, the prime mover 20 converts heat energy into oscillatory acoustical power using a working fluid which is preferably helium, less preferably another suitable gas. In this manner, the prime mover 20 generates an oscillatory helium flow which propagates through the resonance tube 18, and subsequently through the OPTR 40, where it generates net refrigeration power to cool cryogenic propellants as will be more fully explained below.

Preferably, the regenerator 22 has an exterior shell or housing 71 enclosing a highly porous heat absorptive material 72. Most preferably, housing 71 is made from Haynes 230 alloy and is insulated such that the regenerator 22 operates substantially adiabatically, or at least as adiabatically as possible. The heat absorptive material 72 has high heat capacity and preferably low to moderate thermal conductivity (if conductivity is too high, inefficiencies will occur due to heat transfer to the housing 71 and out the cold heat exchanger 21). Preferably, the thermal conductivity of heat absorptive material 72 is not more than 28, preferably not more than 24, preferably not more than 20, W/m-K at 300 K. Preferably, the heat absorptive material 72 has a porosity of at least 0.5, more preferably 0.6, more preferably 0.65, more preferably 0.69, more preferably 0.7, more preferably 0.71, most preferably 0.72, and a heat capacity of at least 400, preferably at least 460, preferably at least 500, preferably at least 557, preferably at least 611, preferably at least 640, J/kg-K at ambient temperature (e.g. 300 K). Preferably, the heat absorptive material 72 is a plurality of layers of stainless steel screen or mesh stacked axially or transversely within the housing 71. A fine stainless steel mesh is preferred, preferably having a mesh size of 60–800, preferably 100–700, preferably 200–600, preferably 300–500, preferably 400, mesh. Preferably, the mesh size is small enough to ensure maximum surface area of contact, and therefore efficient heat transfer, between the mesh and passing gas, but large enough not to significantly impede the flow of helium therethrough. Preferably, the pressure drop across the heat absorptive material 72 in regenerator 22 is not more than 1 psi, preferably not more than 0.4 psi, preferably not more than 0.2 psi.

The cold heat exchanger 21 and aftercooler 27 are preferably of generally conventional shell-and-tube construction. Preferably, the cold heat exchanger 21 and aftercooler 27 are each cooled by water via inlet and outlet 33 and 34, and 31 and 32 respectively. The hot heat exchanger 25 is preferably of generally conventional plate-and-fin construction, with the housing 71 made from Haynes 230 alloy. Also, the thermal buffer tube 26 preferably is made from Haynes 230 alloy. Haynes 230 alloy is preferred herein for its high temperature resistance, high strength, and low thermal conductivity characteristics. Less preferably, other suitable materials having low thermal conductivity can be used. Suitable materials should be temperature resistant up to preferably at least 900 K, more preferably 1000 K, more preferably 1200 K, and have a thermal conductivity not more than 35 W/m-K, preferably not more than 31 W/m-K, most preferably not more than 28 W/m-K, at 1200 K.

The resonance tube 18 couples the prime mover 20 to the OPTR 40, to deliver the oscillatory helium flow generated in the prime mover to the OPTR. Preferably, resonance tube 18 is made from stainless steel. Resonance tube 18 is connected to the OPTR via tuning valve 81 and resonator inertance tube 82. The tuning valve 81 and resonator inertance tube 82 provide tuning control for the phase angle between the oscillating helium mass and the associated pressure wave upon entrance into the first stage 100 of the OPTR 40. Preferably, resonance tube 18 is about 45 feet in length. This length corresponds to a helium oscillation frequency of 30 Hz within the densifier 10 as further explained below.

The OPTR 40 has a first stage 100 and a second stage 200. Each stage is a separate orifice pulse tube refrigeration unit except that the first and second stages share a common thermal block between them 210 as described below. Orifice pulse tube refrigeration units are generally known in the art. In the present invention, each stage preferably has a U-tube configuration as shown in FIG. 1. The construction of the OPTR 40 is best understood from a description of the flow path of oscillatory helium therethrough, beginning from the resonator inertance tube 82.

First, it should be noted that the 'flow' of oscillatory helium (or oscillatory gas) refers to the propagation of the oscillation generated in the working fluid by the prime mover 20, and conveyed to the OPTR 40 via resonance tube 18. Most preferably the working fluid is helium, and in the invented densifier 10 there is preferably zero or negligible (or substantially negligible) bulk mass flow of helium. In other words, individual helium atoms or quanta oscillate between generally fixed points within the densifier 10, preferably with zero or negligible net bulk flow. It is believed that the oscillation of upstream (toward the prime mover 20) helium atoms is transferred to downstream helium atoms by a pressure effect; i.e. upstream helium atoms intermittently impact (at the oscillation frequency) helium atoms immediately adjacent and downstream of the upstream atoms, thereby causing the downstream helium atoms to oscillate in phase with the upstream atoms and so on. The sum of these pressure effects throughout the helium flow path results in an overall pressure wave oscillation in the helium gas within the densifier 10 that is generated by the prime mover 20. With the above in mind, it is also understood and expected that the oscillating pressure wave may generate some bulk mass flow of helium through the densifier 10 (i.e. through the prime mover 20, resonance tube 18 and/or OPTR 40). It is not expected or intended that the absolute mass flow rate of helium through the densifier 10 must be zero; only that such flow rate is preferably zero or negligible.

The helium flow path through the OPTR 40 and its individual components will now be described. A description of the method of operation will follow.

Oscillating helium (oscillation generated in the prime mover 20 and delivered through the resonance tube 18) enters the first stage 100 of the OPTR 40 through the first stage aftercooler 110 from the resonator inertance tube 82. The aftercooler 110 is essentially a heat exchanger, preferably shell-and-tube, to remove heat of compression at the inlet of the first stage regenerator 120. Preferably, the aftercooler 110 is made from copper. Preferably, the first stage aftercooler 110 is operated isothermally at ambient temperature, preferably about 300 K, and is preferably cooled by cooling water through conduit 115. Oscillating helium flows from the first stage aftercooler 110 into the first stage regenerator 120, which is preferably of similar construction to the prime mover regenerator 22. Preferably, the first stage regenerator 120 housing is made from stainless steel. Preferably, the heat absorptive material 73 in the first stage regenerator 120 has substantial heat capacity within the temperature range of the first cryogenic fluid or propellant to be densified, e.g. between 60–90 K for LOX. Preferably, the heat absorptive material in the first stage regenerator 120 is a plurality of layers of stainless steel screen mesh, less preferably another suitable material. The heat absorptive material in the first stage regenerator preferably has a volumetric heat capacity of at least 1 $J/cm^3K$, preferably 1.3 $J/cm^3K$, preferably 1.8 $J/cm^3K$, preferably 2.0 $J/cm^3K$, preferably 2.2 $J/cm^3K$, between 60–90 K. Also, the heat absorptive material 73 of the first stage regenerator 120 preferably has a porosity of at least 0.55, preferably 0.6, preferably 0.63, preferably 0.66 preferably 0.67, preferably 0.68.

The first stage isothermal flow passage 130 connects the outlet of the first stage regenerator 120 to the inlet of the first stage pulse tube 140 via the common thermal block 210. The common thermal block 210 is essentially a heat exchanger having a helium flow passage on one side and a cryogenic flow passage (LOX) on the other. Common thermal block 210 can have shell-and-tube, plate-and-fin, or other suitable configuration, but is most preferably shell-and-tube with helium present in the shell-side. Preferably, the common thermal block 210 has a housing (shell-side) and tubes made from copper, with the interior surface on the tube-side being packed with copper screen or mesh, preferably having a mesh size of 100 mesh. The oscillatory helium flow is split at the common thermal block 210; that is, the common thermal block 210 (on the helium- or shell-side) has an inlet open to the first stage isothermal flow passage 130, and two outlets. The first outlet delivers oscillatory helium flow to the first stage pulse tube 140, while the second outlet delivers oscillatory helium flow to the second stage regenerator 220. The common thermal block 210 serves two functions. First, common thermal block 210 is the first stage cold heat exchanger of the first stage 100, where net refrigeration for the first stage 100 is generated. It is in the common thermal block 210 where heat energy is removed from the first cryogenic liquid to cool and densify the first cryogenic liquid. (E.g., for a thermal block 210 having a shell-and-tube configuration with helium occupying the shell side, the first cryogenic liquid flows through the first cryogenic passage 111 which is connected to the tube side of the thermal block 210, and heat energy is transferred across the tube interface and absorbed by the helium on the shell side of the thermal block 210). Second, common thermal block 210 is the aftercooler of the second stage 200 pulse tube refrigeration unit for regulating the initial helium temperature upon entry into the second stage regenerator 220, and damping temperature oscillations upon entry therein.

Continuing with the first stage 100, oscillatory helium flow enters the first stage pulse tube 140 from the common thermal block 210. The first stage pulse tube 140 is preferably made from stainless steel. A first stage hot heat exchanger 150 is located immediately downstream of the first stage pulse tube 140 which is preferably cooled by water, preferably via conduit 115 as shown in FIG. 1. Preferably, the first stage hot heat exchanger 150 is a shell-and-tube heat exchanger, less preferably plate-and-fin, less preferably another suitable configuration, and is preferably made from copper. Preferably, the shell side of hot heat exchanger 150 is packed with copper screen having a mesh size of 60–150, preferably 80–120, preferably 100, mesh, to increase heat transfer between the helium on the shell-side of hot heat exchanger 150 and the tube wall. Preferably, the first stage hot heat exchanger 150 operates isothermally at substantially ambient temperature, preferably 300 K. The first stage 100 also has a first stage primary orifice 160, inertance tube 170 and reservoir volume 180, which are generally known components of an orifice pulse tube refrigerator, and help improve refrigeration efficiency at the cold heat exchanger, here the common thermal block 210. Preferably, inertance tube 170 and reservoir volume 180 are made from stainless steel. In addition, the first stage 100 preferably has a secondary orifice 190 connecting the first stage hot heat exchanger 150 to the resonator inertance tube 82. It has been found for an orifice pulse tube refrigerator that by tuning the secondary orifice 190, one can further improve cooling efficiency and reduce the operating temperature of the cold heat exchanger (common thermal block 210) of the first stage 100 refrigeration unit.

Turning now to the second stage 200 refrigeration unit, oscillatory helium flow is introduced into the second stage regenerator 220 from the common thermal block 210 as previously described. The second stage regenerator 220 has similar construction to the first stage regenerator 120, preferably having a second stage regenerator housing made from stainless steel. The heat absorptive material 74 in the second stage regenerator 220, however, preferably has adequate heat capacity at or near the temperature of the second cryogenic liquid, e.g. between 13–20 K for liquid hydrogen. Preferably, the heat absorptive material 74 in the second stage regenerator 220 is or comprises a rare earth metal or rare earth metal compound, preferably an erbium compound, more preferably an erbium-praseodymium compound, preferably in the form of spheres, less preferably some other discrete shape, less preferably in a matrix such as fixed particles on a porous substrate. When spheres are used, preferably the spheres have a mean diameter of 60 to 100 microns, more preferably 70 to 90 microns, most preferably 80 to 85 microns. Less preferably, the heat absorptive material 74 can be in any form that does not substantially raise the pressure drop across second stage regenerator 220, and still provides high surface area of contact between the heat absorptive material 74 and the flowing helium gas. The heat absorptive material 74 in the second stage regenerator 220 preferably has a volumetric heat capacity of at least 0.23 $J/cm^3K$, preferably 0.4 $J/cm^3K$, preferably 0.6 $J/cm^3K$, preferably 0.75 $J/cm^3K$, most preferably 0.82 $J/cm^3K$ at 13–14 K, and a volumetric heat capacity of at least 0.5 $J/cm^3K$, preferably 0.6 $J/cm^3K$, preferably 0.7 $J/cm^3K$, most preferably 0.80 $J/cm^3K$ at 18–20 K. Also, the heat absorptive material 74 of the second stage regenerator 220 preferably has a porosity of 0.2–0.5, preferably 0.3–0.45, preferably 0.36–0.4, preferably about 0.38.

Oscillatory helium flow exits the second stage regenerator 220 via second stage isothermal flow passage 230, and enters the second stage pulse tube 240 (preferably made from stainless steel) via the second stage cold heat exchanger 205. Cold heat exchanger 205, preferably has similar construction, and is constructed of similar materials, as the common thermal block 210. The cold heat exchanger 205 is where net refrigeration for the second stage 200 occurs. In cold heat exchanger 205 heat energy is removed from the second cryogenic liquid to be densified at a temperature lower than the first cryogenic liquid, to supercool and densify the second cryogenic liquid. Preferably, cold heat exchanger 205 is of shell-and-tube configuration with helium occupying the shell side. It is preferred that the shell-side of cold heat exchanger 205 contains packed copper screen to effectively increase heat transfer between the helium in the shell-side and the second cryogenic liquid in the tube-side. The preferred screen mesh size 60–150, preferably 80–120, preferably 100, mesh. In this configuration, the second cryogenic liquid flows through the second cryogenic passage 222 which is connected to the tube side of the cold heat exchanger 205, and heat energy is transferred across the tube interface and absorbed by the helium on the shell side of cold heat exchanger 205. The oscillatory helium flow continues through the second stage pulse tube 240, and is delivered to the second stage hot heat exchanger 250, second stage primary orifice 260, inertance tube 270 and reservoir volume 280, similarly as for the first stage 100. The second stage inertance tube 270 and reservoir volume 280 are preferably made from stainless steel. The second stage hot heat exchanger 250 preferably is of similar construction and materials as first-stage hot heat exchanger 150, is operated isothermally at substantially ambient temperature (preferably 300 K), and is cooled by cooling water via conduit 115 along with first stage hot heat exchanger 150 and aftercooler 110. In addition, like first stage 100, second stage 200 also preferably has a secondary orifice 290 connecting the second stage hot heat exchanger 250 to the resonator inertance tube 82.

Preferably, both first 100 and second 200 stages of the OPTR 40 are enclosed within a low temperature jacket 300 that is cooled with a liquid cryogenic coolant below 110 K, e.g. liquid helium, liquid nitrogen, LOX, $LH_2$, etc. The low temperature jacket 300 reduces environmental heat leak to the first and second stages 100 and 200 and increases the efficiency of the OPTR. Nitrogen is most preferred coolant for jacket 300 because it is non-flammable, will not support combustion, and is relatively inexpensive and abundant. Less preferably, helium can be used to cool jacket 300, less preferably oxygen, hydrogen, or any other known liquid cryogen. The selection of cryogen used to cool jacket 300 can be dictated by the degree of cooling required; e.g. helium and hydrogen remain liquid at far lower temperatures than nitrogen or oxygen. The jacket 300 is preferably made from copper with copper tubing for coolant flow. Jacket 300 provides a first layer of temperature insulation to the OPTR 40 which operates at cryogenic temperatures. Preferably, fresh liquid cryogen coolant is continuously delivered to jacket 300 via conduit 301, and vaporized coolant vented via conduit 302. This continuous flow of fresh liquid coolant to jacket 300 ensures a constant jacket temperature. The low temperature jacket 300 is preferably further enclosed within a low pressure chamber 350 to minimize convective heat transfer to the jacket 300 from ambient air. Preferably, the chamber 350 is made from carbon steel, and is evacuated to below $10^{-2}$, preferably $10^{-3}$, preferably $10^{-4}$, preferably $10^{-5}$ torr. In addition, all components of the OPTR 40 (including first and second stage regenerators 120,220, pulse tubes 140,240, isothermal flow passages 130,230) and the first and second cryogenic passages 111,222, are preferably covered or wrapped with at least 0.1, preferably 0.3, preferably 0.5, preferably 0.8, preferably 0.9, preferably 1, inch of super insulation 360 to minimize or prevent radiative heat transfer thereto. Preferably, super insulation 360 comprises double-aluminized Mylar film layers with Dacron netting spacers between the Mylar layers as known in the art. Mylar and Dacron are registered trademarks of DuPont. Preferably, the super insulation 360 has a Mylar layer density of 52 layers per inch.

A fully acoustic densifier 10 as above described functions as follows.

Initially, the densifier 10 (including prime mover 20 and OPTR 40) is charged with helium gas at 200–1000, preferably 300–900, preferably 400–700, preferably 430–600, preferably 450–550, preferably 480–530, preferably 490–510, preferably about 500, psia. The prime mover converts heat energy into oscillatory acoustical power by generating thermoacoustic oscillations in the helium gas from a temperature gradient set up within the regenerator 22 by hot heat exchanger 25. Preferably, the hot heat exchanger 25 operates at 700–1300 K, and the temperature gradient in the regenerator 22 ranges from 1000 K adjacent hot heat exchanger 25 to near ambient or 300 K adjacent the cold heat exchanger 21. Thermal energy is provided by a hot fluid that is delivered to the hot heat exchanger 25 via inlet passage 23 and discharged via outlet passage 24. Preferably, the hot fluid is hot combustion gas resulting from the combustion of hydrogen, methane or natural gas in the presence of air or oxygen. Less preferably, the hot fluid is another fluid, such as steam, that is separately heated via combustion and then delivered to the hot heat exchanger 25. Optionally and preferably, thermal efficiency can be improved by passing the exiting hot fluid through a thermal energy recuperator device (not shown) as known in the art.

Oscillatory helium flow generated within the prime mover 20 is coupled to the OPTR 40 through resonance tube 18. As stated above, resonance tube 18 is preferably about 45 feet in length (and has a diameter of 4–5 inches) corresponding to a 30 Hz helium oscillation frequency for the densifier 10. (The helium oscillation frequency in the invented densifier 10 is most strongly a function of resonance tube 18 length). In the invented densifier 10, the prime mover 20 preferably generates oscillatory acoustical power at a helium oscillation frequency of at least 2, preferably 4, preferably 8, preferably 12, preferably 16, preferably 20, preferably 25, preferably 30, preferably 40, preferably 50, preferably 60, Hz. It will be understood that the length of the resonance tube 18 can be adjusted (lengthened to lower oscillation frequency and shortened to raise oscillation frequency) to provide a desired oscillation frequency. E.g., resonance tube 18 can be 43–47, 41–49, 39–51, 37–53, or 35–55, feet in length, or another length. Likewise, resonance tube 18 can be 3–6, 2–7, 1–8, or 1–10, inches in diameter, or another diameter. The frequency of the oscillating helium is an important parameter that contributes to the efficiency of the first and second stage pulse tubes 140 and 240. The preferred operating frequency of about 30 Hz has been optimized for a particular embodiment of the invented densifier 10 that minimizes heat transfer and pressure drop inefficiencies within the pulse tubes, however the invention is not limited to this embodiment. The resonance tube 18 effectively transfers the acoustic power from the prime mover 20 to the OPTR 40. For 30 Hz operation the preferred length of resonance tube 18 is about 45 feet and the preferred diameter is 4–5 inches.

It will be understood that helium oscillation within the OPTR 40 results in an oscillatory pressure ratio ($P_{max}/P_{min}$) between the compressive and expansive phases of a given quantum of helium. This pressure ratio varies with position in the helium flow path through the OPTR 40. The larger the pressure ratio the greater acoustical power generated. The preferred pressure ratio at the inlet to the first stage pulse tube 140 is 1–1.3, preferably 1–1.25, preferably 1.1–1.23, preferably 1.15–1.22, preferably 1.2. The preferred pressure ratio upon exiting the prime mover 20 is 1.2–1.4, preferably 1.25–1.35, preferably 1.26–1.34, preferably 1.28–1.32, preferably 1.3.

Beginning with the first stage 100, aftercooler 110 receives oscillatory helium flow from the resonance tube 18 (via tuning valve 81 and resonator inertance tube 82). The aftercooler 110 dampens temperature oscillations (resulting from pressure oscillations) of the oscillatory helium gas prior to entering the first stage regenerator 120. As the helium gas oscillates, it undergoes successive compression and expansion, each quantum of helium gas experiencing a temperature increase with compression and a temperature decrease with expansion. Within the first stage regenerator 120, the heat absorptive material 73 absorbs the heat of compression from a quantum of helium gas during the compression phase, and delivers that stored heat energy back to the gas during the expansion phase. This net effect proceeds down the length of the regenerator 120 until at the isothermal flow passage 130, the temperature of the helium gas has been reduced to substantially the operating temperature of the common thermal block 210. Thus, oscillatory helium delivered to the common thermal block 210 from the first stage regenerator 120 causes substantially no net heat effect (either heating or cooling) at the common thermal block 210.

The common thermal block 210 is preferably operated isothermally at steady state, preferably at 40–80, preferably 45–75, preferably 50–70, preferably 52–65, preferably 54–60, preferably about 55, degrees K. At the common thermal block 210, the oscillatory helium flow is split as described above. With respect to the first stage pulse tube 140, oscillating helium gas within the pulse tube 140 shuttles heat energy from the common thermal block 210 against the temperature gradient in pulse tube 140 as known in the art, to be expelled via the first stage hot heat exchanger 150. In this manner, net refrigeration power is generated at the common thermal block 210 effective to supercool or densify the first cryogenic liquid or propellant to a first cryogenic temperature. The first cryogenic liquid, preferably LOX, is delivered to the common thermal block 210 via the first cryogenic passage 111. In the case of LOX, LOX is delivered at its normal boiling point of about 90 K. As it passes through the thermal block 210, LOX is cooled to preferably less than 80, preferably 70, preferably 65, degrees K, and most preferably LOX is cooled to about 60 K.

Oscillatory helium flow is also delivered to the second stage regenerator 220 from the common thermal block 210 as described above. Similar to the first stage regenerator 120, the second stage regenerator 220 functions to lower the helium temperature from that of the common thermal block 210 to substantially that of the second stage cold heat exchanger 205. It is important to minimize heat leak to the cold heat exchanger 205 from the first stage 100 refrigeration unit in order to maximize cooling efficiency at the cold heat exchanger 205. Therefore, the heat absorptive material 74 used in the second stage regenerator 220 is specially selected to ensure maximum cooling of the oscillatory helium prior to entering the second stage cold heat exchanger 205. As stated above, the heat absorptive material 74 in second stage regenerator 220 is preferably a rare earth metal or metal compound.

Cold heat exchanger 205 is preferably operated isothermally, preferably at a temperature of 8–20, preferably 8–16, preferably 9–15, preferably 10–14, preferably about 13.8, degrees K.

Oscillating helium gas within the second stage pulse tube 240 shuttles heat energy from the cold heat exchanger 205, to be expelled via the second stage hot heat exchanger 250 as known in the art. The second stage 200 (second stage pulse tube 240) thereby generates net refrigeration power at the cold heat exchanger 205, similarly to the first stage 100 (and first stage pulse tube 140). The net refrigeration power at the cold heat exchanger 205 is effective to cool or densify the second cryogenic liquid to a second cryogenic temperature. This second cryogenic temperature is lower than the first cryogenic temperature of the supercooled first cryogenic liquid that is densified in the common thermal block 210. Preferably, the second cryogenic liquid $LH_2$. In this embodiment, $LH_2$ is delivered to the cold heat exchanger 205 via the second cryogenic passage 222 at its normal boiling point of about 20 K. Preferably, liquid hydrogen is cooled to less than 18, preferably 17, preferably 16, preferably 15, preferably 14, degrees K, and most preferably liquid hydrogen is cooled to about 13.8 K.

Thus, the invented densifier 10 simultaneously densifies two cryogenic liquids (LOX and $LH_2$) at two different cryogenic temperatures (most preferably 60 K and 13.8 K respectively) within the same apparatus having no moving parts.

The invented densifier 10 is scalable, and can be scaled to deliver a desired degree of refrigeration power at the common thermal block 210 and/or cold heat exchanger 205. For example, the invented densifier 10 can be scaled to provide, 1, 10, 100, 1000, 10000, etc., watts of refrigeration power at the cold heat exchanger 205. The preferred method for scaling the densifier 10 is to adjust the diameter of the helium flow path for each component within the system while keeping the length of each component the essentially constant. Increased acoustic power for refrigeration requires additional mass flow rate. It will be understood that increasing the diameter (cross-sectional area) of the helium flow path through each component of the densifier 10 to accommodate increased mass (and therefore volumetric) flow results in a constant oscillatory helium velocity independent of refrigeration power. It is preferred to maintain a constant oscillatory helium velocity when scaling the invented densifier 10. The above scaling method is particularly preferred for non-hollow tube components such as regenerators 22,120,220. Preferably, the densifier 10 is adapted to minimize turbulence within the helium flow path.

As stated above, in the most preferred embodiment $LH_2$ is cooled to about 13.8 K, and LOX to about 60 K. This results in a density increase of 9.8% and 12% for hydrogen and oxygen respectively over the respective saturated liquids. Increased density results in reduced tank size. The mass of the space shuttle's liquid hydrogen flight tank, for example, can be reduced by 1400 lbs or 6.8% by densifying the liquid hydrogen to a temperature of 14.4 K. The mass of the shuttle's liquid oxygen flight tank can be similarly reduced by 428 lbs (9.5%) by densifying the liquid oxygen to a temperature of 60 K. For in-space vehicles such as orbit transfer vehicles and satellites, densified propellants, by virtue of their lower vapor pressures, reduce tank operating pressure requirements. Specifically, normal boiling point hydrogen and oxygen tanks that are typically maintained at 20 psia can be operated at substantially lower pressure, e.g. 15, 12, 10, 8, or 5, psia using densified propellants. The decreased tank operating pressure results in less pressurant gas (typically helium), and decreased tank wall thickness and tank mass. Torre et al. report that such lower pressure requirements mean that hydrogen and oxygen tank masses can be decreased by 466.7 lbs and 156.4 lbs respectively for in-space vehicles such as orbit transfer vehicles or satellites. (Torre, C. N. et al., "Analysis of a Low Vapor Pressure Cryogenic Propellant Tankage System", J. Spacecraft, vol. 26, no. 5, pp. 368–378).

Most preferably, a fully acoustic densifier 10 according to the invention is effective to simultaneously density two cryogenic liquids or propellants, within the densifier 10 as described above and shown in FIG. 1. However, in the case of, for example $LH_2$ and LOX, there may be some concern in densifying hydrogen fuel within the same apparatus as an oxidizer such as oxygen. In that case, it may be desirable to simultaneously densify liquid hydrogen and liquid oxygen using the invented densifier 10 together with a secondary heat exchanger.

Figure 2:
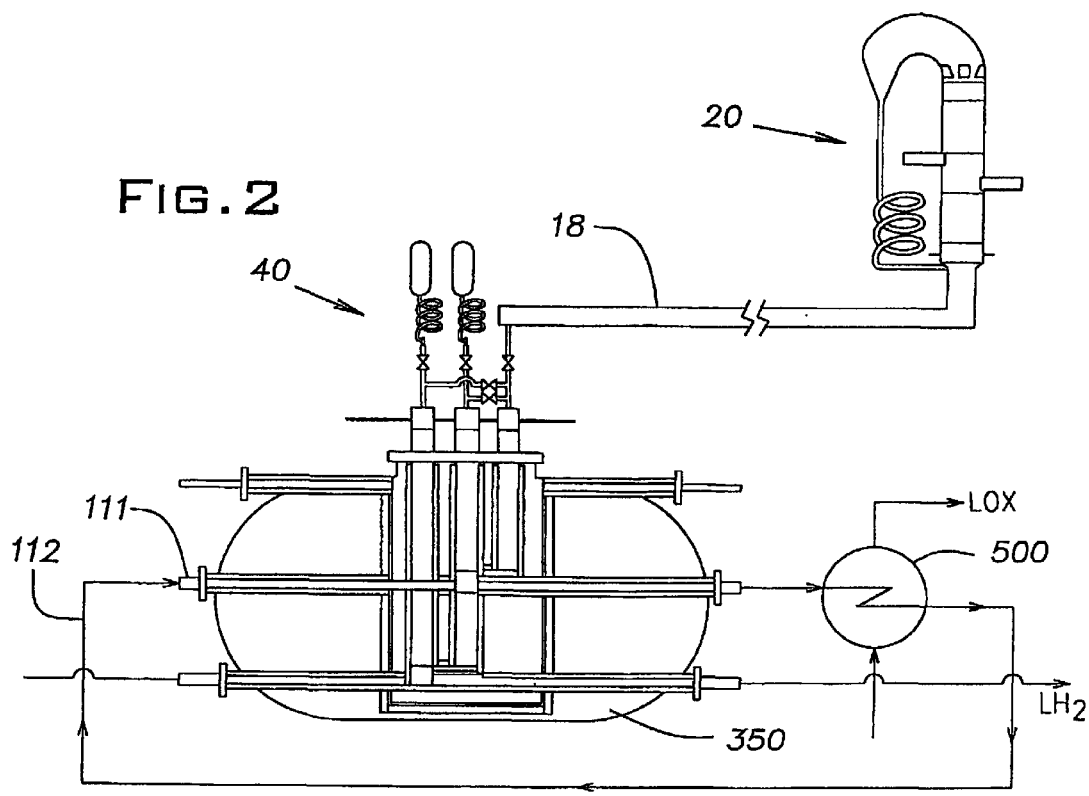
FIG. 2 is a schematic of a second preferred embodiment of a densifier according to the invention.

Referring to FIG. 2, a fully acoustic densifier 10 is shown as in FIG. 1, with a secondary heat exchanger 500 connected to the first cryogenic passage 111 via an inert recycle passage 112. In this embodiment, an inert cryogenic liquid, such as liquid nitrogen, flows through the inert recycle passage 112 (and first cryogenic passage 111), and is cooled by the common thermal block 210 in place of liquid oxygen. ($LH_2$ is still densified in cold heat exchanger 205 as before). Cooled liquid nitrogen is subsequently fed into secondary heat exchanger 500 to separately densify liquid oxygen, some distance from the hydrogen stream flowing through the second cryogenic passage 222. It should be noted that this embodiment is less preferred because cooling efficiency for oxygen will be significantly lower due to heat leak to the cooled nitrogen stream prior to entering secondary heat exchanger 500. In addition, the normal melting point of liquid nitrogen is 63.14 K meaning that LOX cannot be cooled to the preferred 60 K as in the first preferred embodiment without maintaining the nitrogen stream under vacuum. Hence, this second embodiment is used only where the proximity of flowing LOX and $LH_2$ streams is of significant concern.

According to a further preferred embodiment, a plurality of invented fully acoustic densifiers 10 can be employed in series (see FIG. 4) or parallel (see FIG. 5) configurations. In the serial configuration of FIG. 4, the cryogenic liquids are initially fed through inlets 111-a and 222-a respectively. Subsequently, the cryogenic liquid effluents from each densifier 10 are fed into the immediately downstream densifier, until ultimately the final fully densified liquids exit the serial system via outlets 111-b and 222-b respectively. In the serial configuration, each cryogenic liquid is densified incrementally until the desired degree of densification is obtained at the appropriate outlet 111-b or 222-b. It will be understood that in a serial densification system as shown in FIG. 4, each individual densifier 10 operates at lower refrigeration power than a stand-alone fully acoustic densifier must operate to achieve equivalent densification of the cryogenic liquids. A serial flow system may be preferred to minimize or lower the required input power to individual densifiers, or otherwise to efficiently achieve highly densified cryogenic liquids or propellants compared to a stand-alone densifier.

In the parallel flow configuration of FIG. 5, the cryogenic liquids are also initially fed through inlets 111-a and 222-a respectively, and eluted from outlets 111-b and 222-b. In the parallel configuration, the full degree of densification is accomplished in each densifier 10 on a fraction of the total desired flow. These fractions are recombined prior to exiting from the appropriate outlet 111-b or 222-b. A parallel flow configuration can be used to achieve high flow rates of densified cryogenic liquids or propellants.

A system having a plurality of fully acoustic densifiers 10 according to the invention can be designed utilizing a combination of serial- and parallel-flow densifiers 10 to accommodate a wide range of propellant flow rates, cooling capacities, and temperature requirements.

Preferably, in both the serial- and parallel-flow configurations, the densifiers 10 are each enclosed individually within low temperature jackets 300-a similarly as above described with respect to the first preferred embodiment. Also, preferably the densifiers 10 are enclosed, preferably together, within a low pressure chamber 350-a also as above described.

Figure 3:
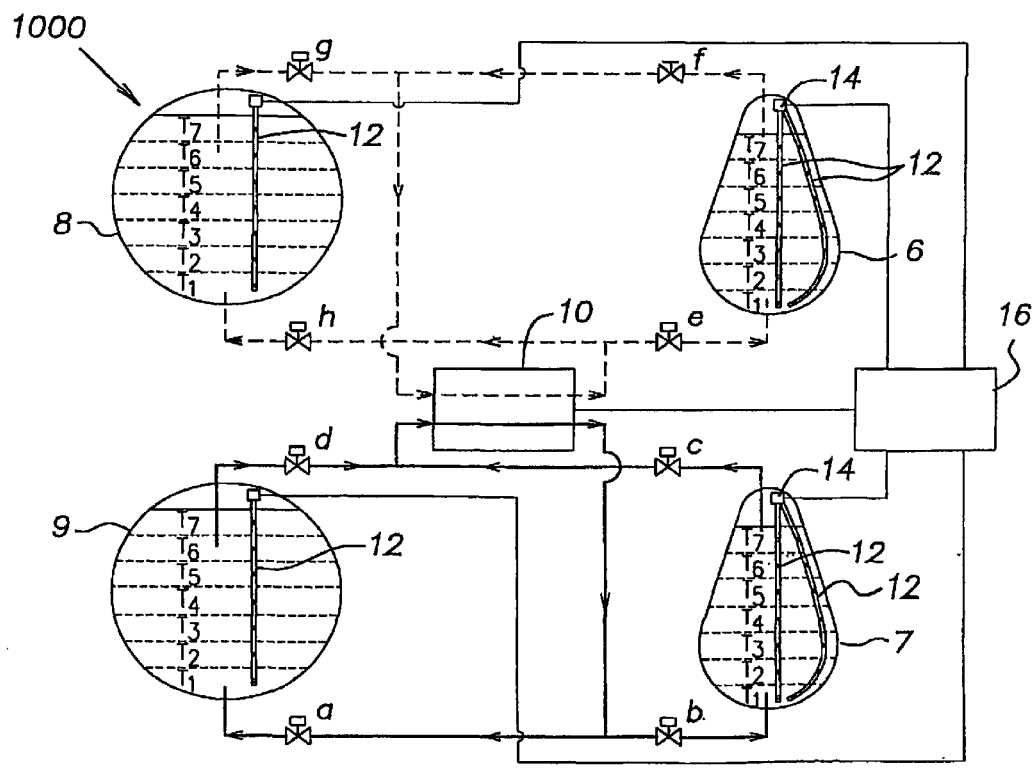
FIG. 3 is a schematic of a densified propellant management system incorporating a densifier according to the invention.

Preferably, the invented fully acoustic densifier 10 (or plurality of densifiers in serial- or parallel-flow as described) is implemented as part of a densified propellant management system 1000 as shown in FIG. 3. Referring to FIG. 3, a LOX flight tank 6 and $LH_2$ flight tank 7 are each filled with their respective propellants prior to lift off of an aerospace vehicle. These flight tanks are filled from the bottom with the cryogenic propellants. While awaiting lift off, heat leaking into the tanks 6,7 causes the liquid therein to warm and stratify due to natural buoyancy forces resulting from the temperature-induced changes in density. The result within each tank is a temperature (and therefore density) gradient, with densified or supercooled liquid entering each tank 6,7 at the bottom and relatively warm liquid rising toward the top. These temperature and density gradients are represented in FIG. 3, where temperature increases from $T_1$ at the bottom of each tank to $T_7$ at the top, with $T_2$, $T_3$, $T_4$, $T_5$, and $T_6$ indicating intermediate temperatures between $T_1$ and $T_7$. (Note that correspondingly labeled temperatures within each tank 6 and 7 are not the same; i.e. $T_1$ in oxygen tank 6 is not the same as $T_1$ in hydrogen tank 7 and so on).

The invented densified propellant management system 1000 counteracts the heat leak into the oxygen and hydrogen flight tanks 6 and 7 by recovering warm propellant from the top of each flight tank 6,7, and re-densifying the recovered warm propellant to be reintroduced therein. The densified propellant management system 1000 includes an invented fully acoustic densifier 10 to simultaneously density two cryogenic propellants (preferably hydrogen and oxygen), and cryogenic temperature probes 12 to measure localized temperatures within the cryogenic propellant flight tanks (e.g. LOX tank 6 and $LH_2$ tank 7). Preferably, the densified propellant management system 1000 also includes at least one (preferably at least two) in-tank multiplexer units 14 for collecting and transmitting cryogenic liquid temperature data measured by probes 12, and a controller unit 16 to regulate liquid cryogenic propellant flow rates and/or densifier refrigeration power based upon the temperature data measured by probes 12. Preferably, the temperature probes 12 are cryogenic liquid temperature probes (preferably as described in co-pending U.S. patent application Ser. No. 09/460,816 filed on Dec. 14, 1999, the content of which is incorporated herein by reference). Preferably, the temperature probes 12 are made from a number of adhered dielectric strips that remain flexible at ambient temperature (e.g. 300 K), with a series of temperature sensing units disposed at spaced intervals along the length of the probes. The temperature sensing units are effective to measure cryogenic temperatures at different levels within a cryogenic vessel. The preferred probes can be oriented into generally any length-wise shape within the contour of a particular vessel effective to measure the temperature gradient of a cryogenic liquid therein. Once the vessel is filled with cryogenic liquid, a preferred probe remains generally rigid in the shape in which it was oriented at ambient temperature.

A densified propellant management system 1000 as above described is implemented as follows. Referring to FIG. 3, the liquid propellants are provided from their respective sources, e.g. a LOX storage tank or dewar 8 and a $LH_2$ storage tank or dewar 9. Like the flight tanks, dewars 8 and 9 are also fitted with temperature probes 12 to measure temperature data and transmit the same to a controller 16 for densification control. First, prior to filling the flight tanks, the fully acoustic densifier 10 supercools the LOX and $LH_2$ propellants below their respective saturation temperatures within their respective storage dewars 8 and 9. This is achieved by re-densifying and recycling back into the dewars relatively warm propellant withdrawn from the top of each dewar as shown. The recycle flow rate (the rate at which warm liquid is withdrawn from each dewar to be re-densified and reintroduced) of each propellant, and/or the refrigeration power of the densifier 10 is/are regulated by the controller 16 as known in the art, based upon the temperature data measured by temperature probes 12 in dewars 8 and 9. In this manner, the densifier 10 maintains densified LOX in the oxygen dewar 8 and densified $LH_2$ in the hydrogen dewar 9.

When it is time to fill the flight tanks, liquid propellant is withdrawn from each storage dewar 8,9 and delivered into the appropriate flight tank 6,7, preferably via the densifier 10. This way, freshly densified propellant (LOX or $LH_2$) is delivered into the appropriate flight tank 6,7. Less preferably, liquid propellant is transferred from each storage dewar 8,9 directly to the appropriate flight tank 6,7 without being re-densified. Conventional flow rates of densified liquid cryogenic propellants for filling the flight tanks 6,7 are known in the art. Preferably, liquid at the bottom of each storage dewar 8,9 is withdrawn first, e.g. from a siphon tube extending from the top of each dewar 8,9 to the base of the cryogenic liquid inside the dewar. Once the flight tanks 6,7 are filled, the densifier 10 maintains densified propellants within the flight tanks 6,7 via the same recycle and re-densification methodology previously described. The piping and valve configuration shown in FIG. 3 is one embodiment providing the necessary connections between the dewars 8,9 the densifier 10, and flight tanks 6,7 for the densified propellant management system 1000 described above. It will be understood from the above that a system 1000 as described can operate in three modes:

Mode 1: propellant densification within the storage dewars 8,9;

Mode 2: propellant transfer from dewars 8,9 into the flight tanks 6,7; and Mode 3: propellant densification within the flight tanks 6,7.

In the piping and valve configuration of FIG. 3, hydrogen flow is indicated by a solid line, and oxygen flow by a dashed line; flow directions for each stream are indicated by arrows. During each mode of operation, the valves in FIG. 3 are actuated as shown in table 1. In table 1, the term ON does not necessarily require the indicated valve be completely open, and the term OFF does not necessarily require the indicated valve be completely closed.

TABLE 1

Valve actuation chart for piping and valve system of FIG. 3

| | Valves | | | | | | | |
|---|---|---|---|---|---|---|---|---|
| Mode | a | b | C | d | e | f | g | H |
| 1 | ON | OFF | OFF | ON | OFF | OFF | ON | ON |
| 2 | OFF | ON | OFF | ON | ON | OFF | ON | OFF |
| 3 | OFF | ON | ON | OFF | ON | ON | OFF | OFF |

It should be noted that valves indicated in FIG. 3 merely indicate a need to control, limit, restrict or prevent fluid flow; i.e. they do not necessary imply a conventional valve. For example, metering valves, on/off valves, flow controllers, pressure controllers, other known flow control devices, and combinations thereof are known in the art and can be used for cryogenic propellant flow control. Further, it will be apparent to persons of ordinary skill in the art that piping and valve configurations other than that shown in FIG. 3 are possible and can be used to implement the invented management system 1000.

A primary advantage of the invented fully acoustic densifier 10 over existing densification systems is that the invented densifier has no moving parts. The result is a system that is reliable, simple to operate, and easily maintained, resulting in overall lower operating costs. The invention is also inherently stable which increases reliability. The stability of the invention is a significant advantage over densification systems using rotating machinery which have been shown to be unstable, especially when used to evaporate cryogenic liquids.

In addition, the invented densifier 10 is safer than existing densification systems because the working fluid (helium) is an inert gas and can be used to supercool both oxidizers (oxygen) and fuels (hydrogen). Further, the invention does not require the use of sub-atmospheric pressure to produce densified liquids and as a result is much safer than existing systems that operate under sub-atmospheric pressures. The liquid propellants (LOX and $LH_2$) that are densified in the invented densifier 10 are maintained in separate flow streams at nominal pressures of 30 psia and are separated by a high pressure (500 psia) inert helium gas phase within the OPTR 40. Thus, at least two critical failures would be required for the hydrogen and oxygen propellants to mix; a breach of LOX flow stream pipe integrity and a breach of $LH_2$ flow stream pipe integrity. In addition, within the OPTR 40 high pressure helium would tend to prevent $LH_2$ or LOX leakage should a minor fracture in the piping of either flow stream occur. Monitoring the helium for pressure decay is an added safety feature that would allow time for a safe shutdown of the system. Another safety advantage of the invented densifier 10 is that there are no ignition sources located near the OPTR 40. The high temperature prime mover 20 and related combustion process are preferably located at least 30–60 feet from the OPTR 40 due to the required length of resonance tube 18. By contrast, existing densification systems use rotating machinery, high voltage, high amperage electric motors, and sub-atmospheric conditions that dramatically reduce their operational safety.

Simultaneous densification of two cryogenic liquids at different temperatures is a significant advantage of the present invention. The invention eliminates the expense of developing and implementing two separate systems to handle two different cryogenic propellants necessary for launch vehicles. Further, the invented densifier 10 generally does not consume helium and therefore is preferably filled only once per application. Only minimal helium replenishment is required due exclusively to helium leaks; i.e. at a rate of at most 10% per year for a large densifier 10 generating up to 1000 watts of cooling power at the cold heat exchanger 205.

The invented densifier 10 is scaleable to accommodate a variety of heat loads and temperature ranges. For example, the invention can remove heat from cryogenic liquids below the triple point of all cryogenic liquids except helium. Therefore, the invention can be used to produce slush cryogenic fluids which are a mixture of triple point liquid and solids.

The invented densifier 10 can be used as a refrigerator for removing heat from a secondary system. A cryogenic liquid being densified can be used to absorb heat from a secondary system such as a liquid hydrogen or nitrogen cold wall. The fully acoustic densifier 10 replaces typical open looped refrigeration systems for cold walls in which evaporative cooling of normal boiling point liquid nitrogen or hydrogen is utilized. This reduces operating costs by eliminating boil-off.

The invention can also be used to densify cryogenic fuels for use in vehicles such as cars, trucks, trains, ships, planes, etc., and also to density cryogenic liquid fuels at refueling stations for all of these vehicles.

In addition, the invented densifier 10 can be used for in-orbit cryogenic liquid densification, thus eliminating boil-off of precious cryogenic propellants, and minimizing tank sizes for storing cryogens in space. In this embodiment, the combustion for generating heat input into the prime mover 20 can be replaced with, e.g., a solar collector/concentrator effective to focus sunlight onto the hot heat exchanger, inducing the required temperature gradient and causing thermal oscillations to occur.

In a less preferred embodiment, the densifier 10 utilizes a flexure bearing compressor that uses electric power to generate the necessary thermoacoustic pressure wave in place of the prime mover 20. This embodiment is preferred only in particular situations where fuels such as natural gas or hydrogen are not available to generate hot combustion gas for heat input into the hot heat exchanger 25 of the prime mover 20.

Although the hereinabove described embodiments of the invention constitute the preferred embodiments, it should be understood that modifications can be made thereto without departing from the scope of the invention as set forth in the appended claims.

What is claimed is:

1. A densifier for densifying two cryogenic liquids, said densifier comprising an oscillatory power source for generating oscillatory power, a resonance tube, and a pulse tube refrigerator, said pulse tube refrigerator being a two-stage pulse tube refrigerator having a first stage refrigeration unit and a second stage refrigeration unit, said first stage refrigeration unit being adapted to supercool a first cryogenic liquid to a first cryogenic temperature, said second stage refrigeration unit being adapted to supercool a second cryogenic liquid to a second cryogenic temperature, wherein said second cryogenic temperature is lower than said first cryogenic temperature.

2. A densifier according to claim 1, said oscillatory power having a frequency of at least 2 Hz.

3. A densifier according to claim 1, said resonance tube being about 45 feet in length.

4. A densifier according to claim 3, said resonance tube having a diameter of 4–5 inches.

5. A densifier according to claim 1, said densifier being a fully acoustic densifier wherein said oscillatory power source is an acoustic heat engine and said oscillatory power is oscillatory acoustical power.

6. A densifier according to claim 5, said acoustic heat engine being a thermoacoustic prime mover.

7. A densifier according to claim 1, said densifier further comprising a working fluid.

8. A densifier according to claim 7, said working fluid being helium having an initial pressure of 200–1000 psia.

9. A densifier according to claim 1, wherein at least one of said first stage refrigeration unit and said second stage refrigeration unit is an orifice pulse tube refrigeration unit.

10. A densifier according to claim 9, wherein said orifice pulse tube refrigeration unit has a primary orifice and a secondary orifice.

11. A densifier according to claim 9, wherein said orifice pulse tube refrigeration unit has an inertance tube and a reservoir volume.

12. A densifier according to claim 1, said first stage refrigeration unit comprising a first stage cold heat exchanger, said second stage refrigeration unit comprising a second stage cold heat exchanger, wherein said first cryogenic liquid is densified in said first stage cold heat exchanger and said second cryogenic liquid is densified in said second stage cold heat exchanger.

13. A densifier according to claim 12, said first stage refrigeration unit further comprising a first stage regenerator and a first stage pulse tube, said second stage refrigeration unit further comprising a second stage regenerator, wherein said first stage cold heat exchanger is a common thermal block.

14. A densifier according to claim 13, wherein said common thermal block is a shell-and-tube heat exchanger having a shell-side to accommodate a working fluid and a tube-side to accommodate said first cryogenic liquid, said shell-side having an inlet, a first outlet and a second outlet, said inlet of said shell-side being connected to said first stage regenerator, said first outlet of said shell-side being connected to said first stage pulse tube, and said second outlet of said shell-side being connected to said second stage regenerator, wherein said common thermal block delivers oscillatory flow of said working fluid from said first stage regenerator to each of said first stage pulse tube and said second stage regenerator.

15. A densifier according to claim 12, said first stage cold heat exchanger being operated at 40–80 K.

16. A densifier according to claim 12, said second stage cold heat exchanger being operated at 8–20 K.

17. A densifier according to claim 5, said acoustic heat engine comprising a regenerator and a hot heat exchanger, said regenerator having a regenerator housing and a first heat absorptive material disposed within said housing, said first heat absorptive material having a heat capacity of at least 400 J/kg-K at about 300 K.

18. A densifier according to claim 17, said first heat absorptive material having a thermal conductivity of not more than 28 W/m-K at 1200 K.

19. A densifier according to claim 17, said first heat absorptive material having a porosity of at least 0.5.

20. A densifier according to claim 17, said first heat absorptive material comprising a plurality of layers of 60–800 mesh stainless steel screen.

21. A densifier according to claim 1, said first stage refrigeration unit comprising a first stage regenerator, a first stage cold heat exchanger and a first stage pulse tube, said first stage regenerator having a first stage regenerator housing and a second heat absorptive material disposed within said housing, said second heat absorptive material having a volumetric heat capacity of at least 1 J/cm$^3$K between 60–90 K.

22. A densifier according to claim 21, said second heat absorptive material having a porosity of at least 0.55.

23. A densifier according to claim 21, said second heat absorptive material comprising a plurality of layers of stainless steel screen mesh.

24. A densifier according to claim 1, said second stage refrigeration unit comprising a second stage regenerator, a second stage cold heat exchanger and a second stage pulse tube, said second stage regenerator having a second stage regenerator housing and a third heat absorptive material disposed within said housing, said third heat absorptive material having a volumetric heat capacity of at least 0.23 J/cm$^3$K at 13–14 K.

25. A densifier according to claim 24, said third heat absorptive material having a porosity of 0.2–0.5.

26. A densifier according to claim 24, said third heat absorptive material having a volumetric heat capacity of at least 0.5 J/cm$^3$K at 18–20 K.

27. A densifier according to claim 24, said third heat absorptive material comprising a material selected from the group consisting of rare earth metals and rare earth metal compounds.

28. A densifier according to claim 27, said third heat absorptive material comprising an erbium-praseodymium compound.

29. A densifier according to claim 24, said third heat absorptive material being in the form of spheres having a mean diameter of 60–100 microns.

30. A densifier according to claim 1, wherein said first cryogenic temperature is less than 80 K.

31. A densifier according to claim 1, wherein said second cryogenic temperature is 13–20 K.

32. A densifier according to claim 1, wherein said first cryogenic liquid is liquid oxygen and said second cryogenic liquid is liquid hydrogen.

33. A densifier according to claim 32, wherein said liquid oxygen is supercooled to about 60 K.

34. A densifier according to claim 32, wherein said liquid hydrogen is supercooled to about 13.8 K.

35. A densifier according to claim 1, said densifier being adapted to densify at least one of said first cryogenic liquid and said second cryogenic liquid to a slush cryogenic fluid.

36. A densifier according to claim 1, wherein said resonance tube is 35–55 feet in length.

37. A densifier according to claim 5, wherein said acoustic heat engine is a thermoacoustic Stirling heat engine.

38. A densifier according to claim 5, wherein said acoustic heat engine operates between 700–1300 K.

39. A densifier according to claim 5, wherein said acoustic heat engine is supplied with thermal energy from the combustion of a fuel selected from the group consisting of hydrogen, methane and natural gas.

40. A densifier according to claim 6, wherein said prime mover is a traveling wave acoustical prime mover.

41. A densifier according to claim 1, further comprising a low temperature jacket, said jacket substantially enclosing said pulse tube refrigerator.

42. A densifier according to claim 1, said densifier further comprising a low pressure chamber evacuated to below $10^{-2}$ torr.

43. A densifier according to claim 1, said densifier further comprising a secondary heat exchanger and an inert recycle passage, wherein said secondary heat exchanger is connected to said first stage refrigeration unit by said inert recycle passage.

44. A densifier according to claim 5, said oscillatory acoustical power being generated via a working fluid of helium gas, said helium gas having an oscillatory pressure ratio of 1.2–1.4 at an exit of said acoustic heat engine.

45. A densifier according to claim 44, said first stage refrigeration unit comprising a first stage regenerator, a first stage cold heat exchanger, and a first stage pulse tube, wherein said helium gas has an oscillatory pressure ratio of 1–1.3 at an entrance of said first stage pulse tube.

46. A densifier according to claim 1, said oscillatory power having a frequency of about 30 Hz.

47. A densified propellant management system comprising a densifier, and a cryogenic temperature probe, wherein said densifier comprises an oscillatory power source for generating oscillatory power, a resonance tube, and a pulse tube refrigerator, said pulse tube refrigerator being a two-stage pulse tube refrigerator having a first stage refrigeration unit and a second stage refrigeration unit, said first stage refrigeration unit being adapted to supercool a first cryogenic liquid to a first cryogenic temperature, said second stage refrigeration unit being adapted to supercool a second cryogenic liquid to a second cryogenic temperature, wherein said second cryogenic temperature is lower than said first cryogenic temperature.

48. A system according to claim 47, said system further comprising a first cryogenic liquid storage dewar, wherein said cryogenic temperature probe is disposed within said storage dewar and is effective to measure a temperature gradient of said first cryogenic liquid within said storage dewar.

49. A system according to claim 47, wherein said first cryogenic liquid is liquid oxygen and said second cryogenic liquid is liquid hydrogen.

50. A system according to claim 47, wherein said cryogenic temperature probe comprises a dielectric strip and a series of temperature sensing units disposed at spaced intervals along said strip, said temperature sensing units being effective to measure a temperature gradient within a cryogenic liquid.

51. A system according to claim 47, comprising a plurality of said densifiers arranged in a configuration selected from the group consisting of parallel configuration and serial configuration.

* * * * *